(No Model.) 5 Sheets—Sheet 1.
H. BAINES.
CAR TRUCK.
No. 578,305. Patented Mar. 2, 1897.
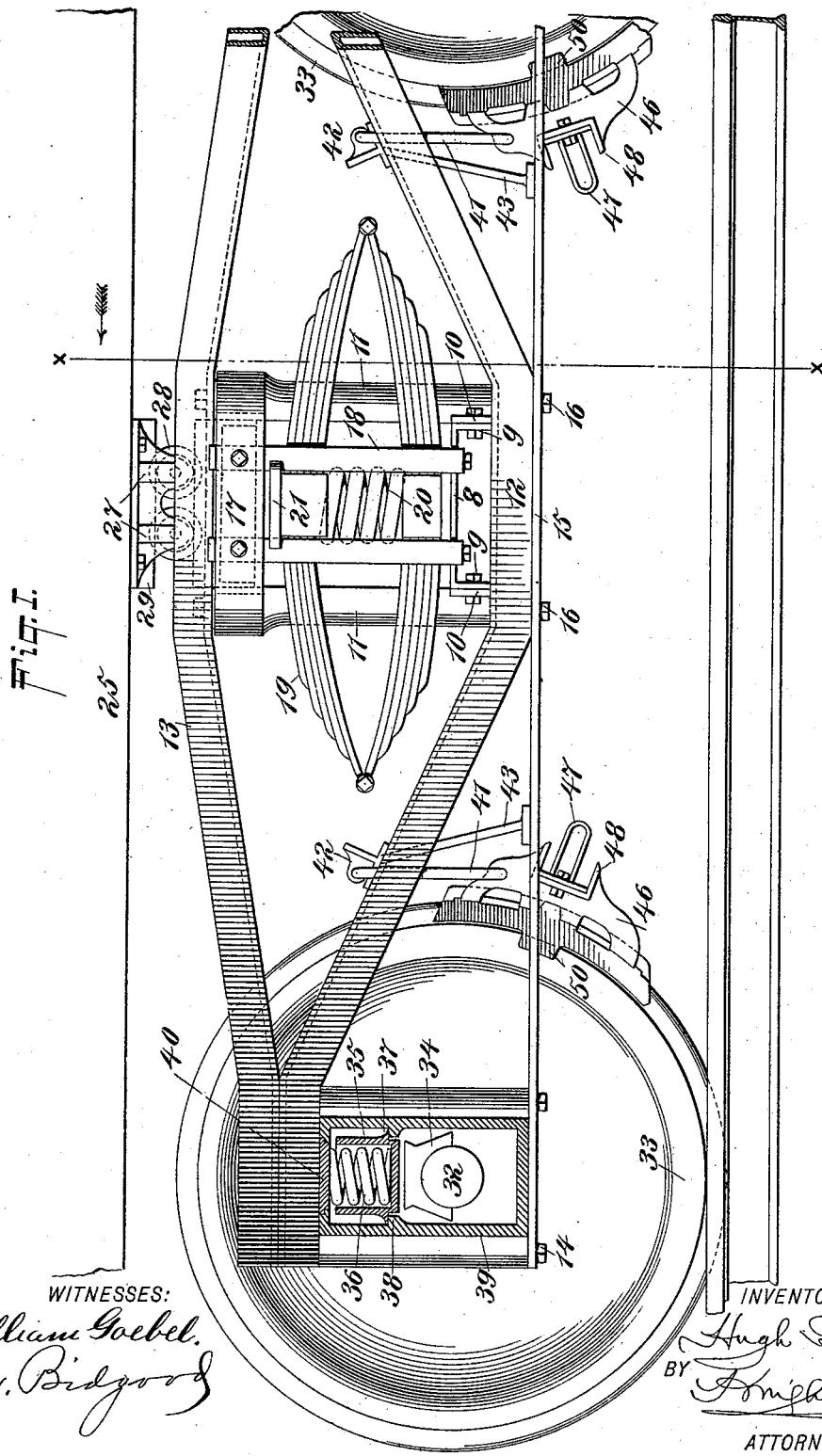
Fig. I.
WITNESSES:
William Goebel.
M. V. Bidgood
INVENTOR
Hugh Baines
BY
ATTORNEYS.

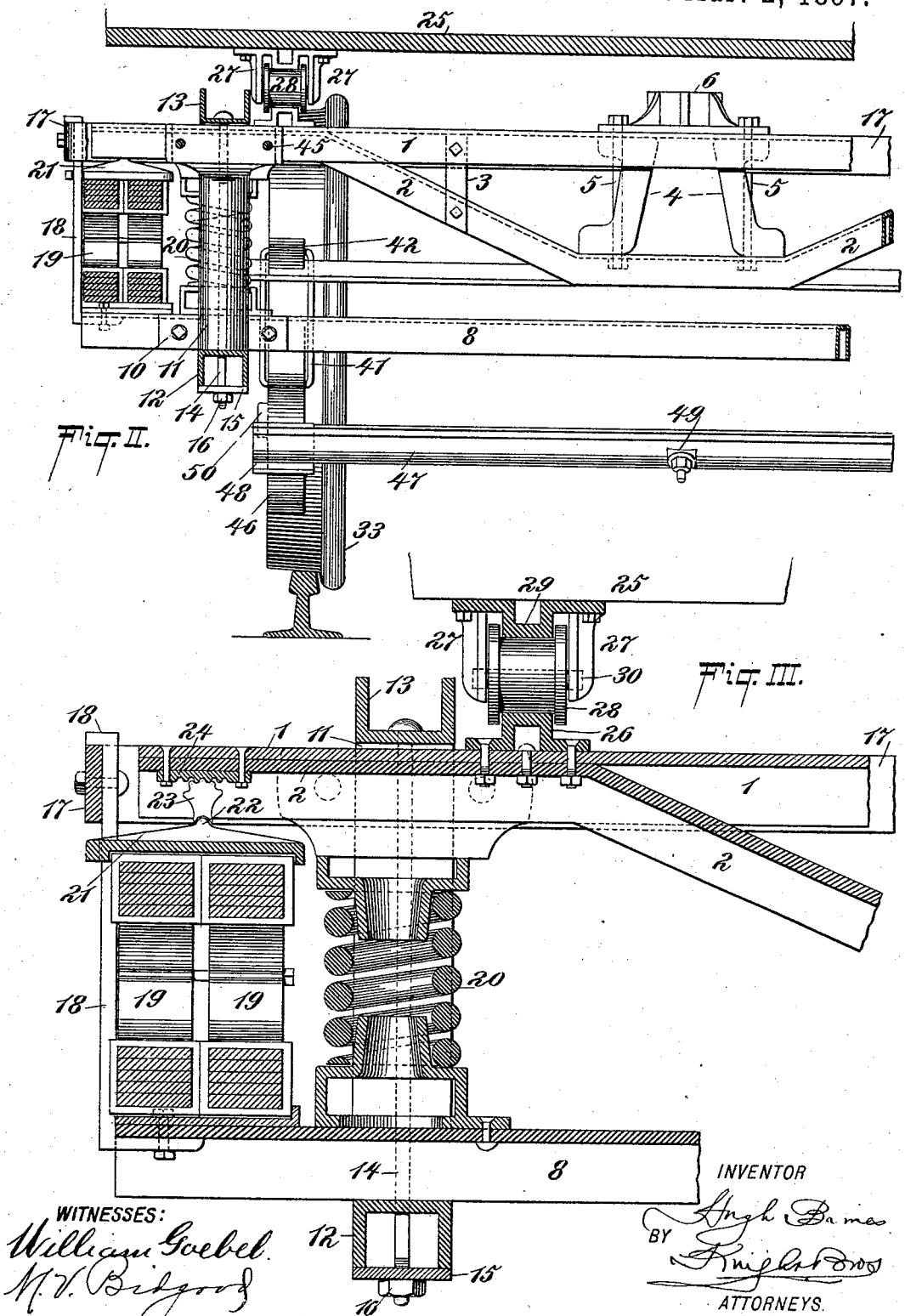

(No Model.)　　　　　　　　　　　　　　　　　　5 Sheets—Sheet 3.
H. BAINES.
CAR TRUCK.
No. 578,305.　　　　　　　　　　　　　　Patented Mar. 2, 1897.
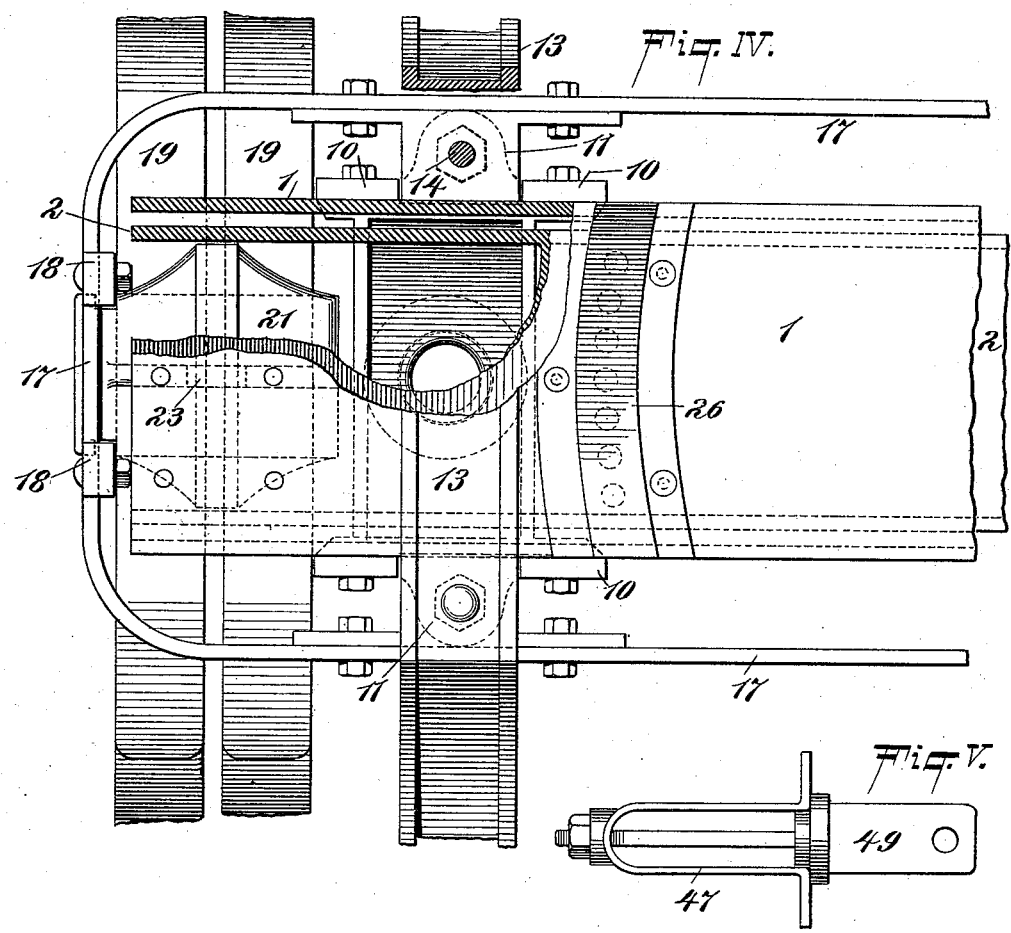
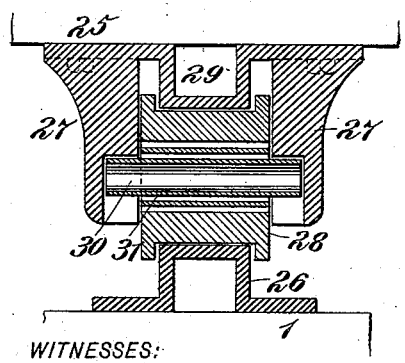
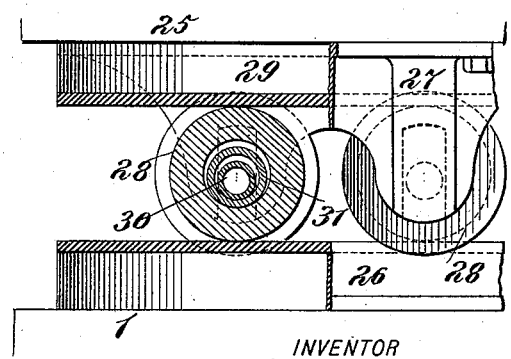
WITNESSES:　　　　　　　　　　　　　　　　INVENTOR
　　　　　　　　　　　　　　　　　　　　　　BY
　　　　　　　　　　　　　　　　　　　　　　ATTORNEYS.

(No Model.)  5 Sheets—Sheet 4.
H. BAINES.
CAR TRUCK.
No. 578,305. Patented Mar. 2, 1897.
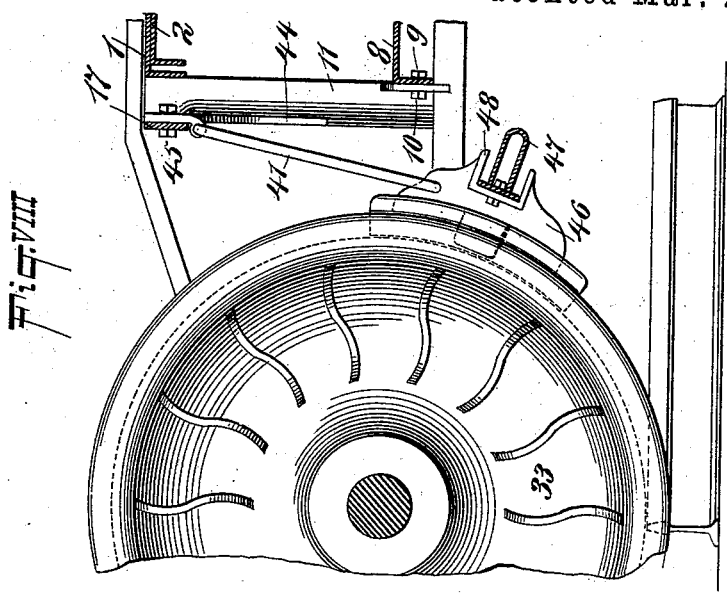
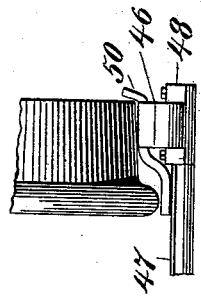
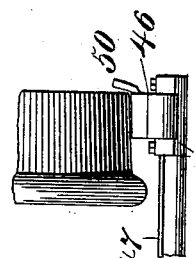
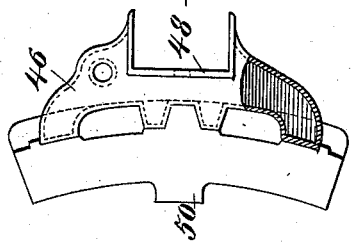
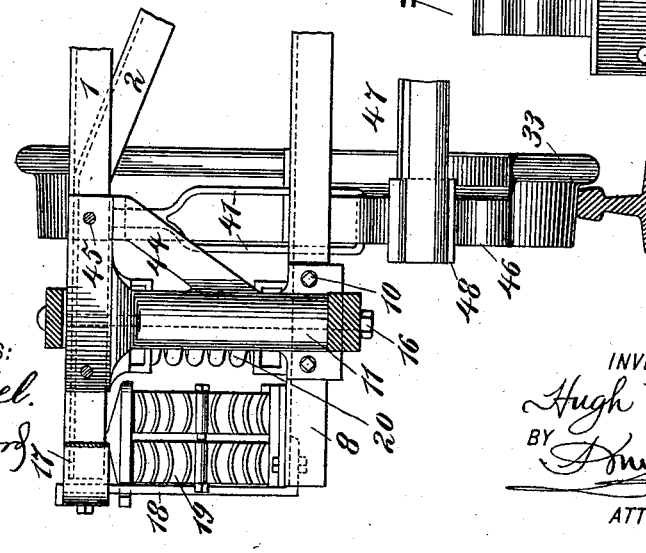
WITNESSES:
William Goebel.
N. V. Bidgood
INVENTOR
Hugh Baines
BY
Knight Bros
ATTORNEYS.

(No Model.) 5 Sheets—Sheet 5.
H. BAINES.
CAR TRUCK.
No. 578,305. Patented Mar. 2, 1897.
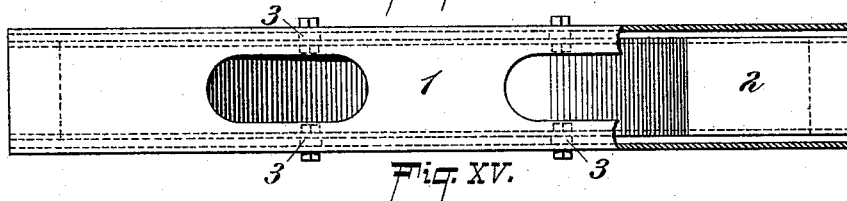
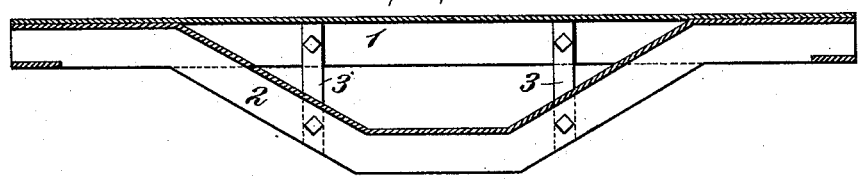
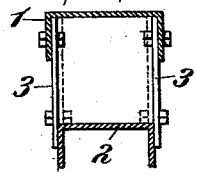
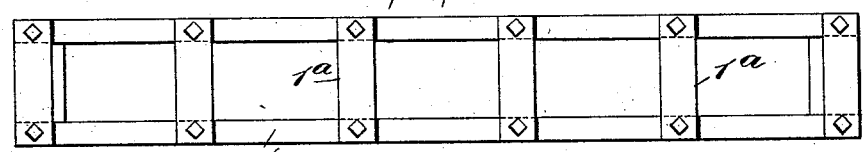
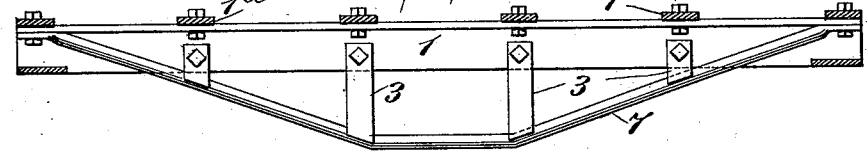
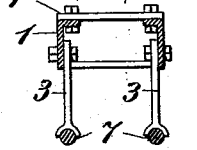
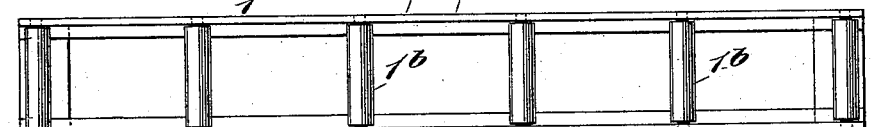
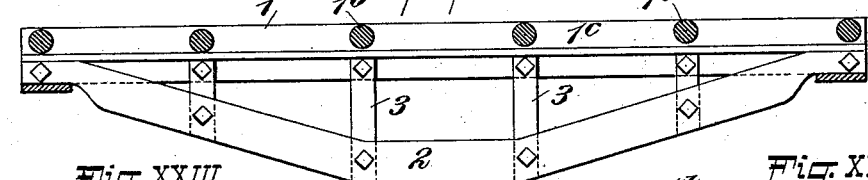
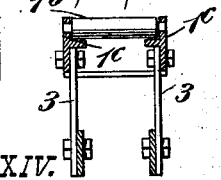
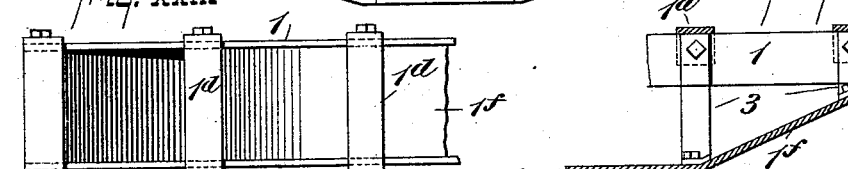
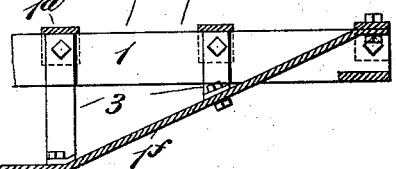
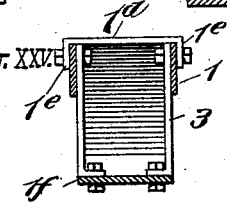
WITNESSES:
INVENTOR
ATTORNEY.

UNITED STATES PATENT OFFICE.

HUGH BAINES, OF BROOKLYN, NEW YORK, ASSIGNOR TO THE BAINES CAR TRUCK COMPANY, OF NEW YORK, N. Y.

CAR-TRUCK.

SPECIFICATION forming part of Letters Patent No. 578,305, dated March 2, 1897.

Application filed June 7, 1892. Serial No. 435,868. (No model.)

*To all whom it may concern:*

Be it known that I, HUGH BAINES, of the city of Brooklyn, county of Kings, State of New York, have invented certain new and useful Improvements in Car-Trucks, of which the following is a specification.

My present invention relates to improvements on the railway-car truck for which Letters Patent of the United States were granted to me on the 2d day of November, 1886, No. 352,028, the improvements consisting in certain details of construction hereinafter particularly described. Among other things in my previous patent I showed and described wooden fillings in conjunction with iron transoms, but it has been found by experiment and numerous tests, extending over years, that the wooden portion of the structure possesses certain disadvantages, and it is one of the objects of my present invention to overcome them. In my former patent the channel-iron of which I made the upper transom, as therein described, was lined with wood, and in modifying the structure I eliminate the wood, as before stated, and I introduce in lieu thereof a duplicate channel-iron and connecting braces and brackets, and by this means I greatly increase the strength of the structure and make the truck in every way more durable and satisfactory. In carrying this portion of my invention into effect I produce what I choose to term a "lattice" truck-bolster, the supplementary or auxiliary channel-iron being attached to and beneath the main channel-iron at its outer ends and being arched relatively to the main channel-iron in the manner shown in the drawings hereinafter referred to.

The second part of my invention relates to an improved form of arch-bar. My improved arch-bar consists of a channel-iron for the top arch-bar and an inverted channel-iron for the lower arch-bar, the two arch-bars being arranged back to back and suitably secured to each other and to the pedestals or pillars. The object of this part of my invention is to eliminate weight in the truck-frame as much as possible and at the same time secure and retain all the strength possible and necessary. In discarding the flat arch-bars I avoid the necessity of making the arch-bars very heavy in order that they may bear the strain usually imposed upon them. The channel-iron arch-bars suit the purpose exactly, and for this reason I have employed them, and preferably in the manner described.

The third part of my invention relates to the employment and distribution of elliptic and coil springs. The graduated elliptic springs are arranged at the extreme ends of the truck and beyond the wheel-treads and arch-bars, and they are of sufficient strength to carry and support the car when not loaded. The coil-springs are located inside and nearer to the wheels than the elliptic springs and are arranged, preferably, contiguous to and approximately in the same vertical plane as the arch-bars, and they are adapted to assist and coöperate with the elliptic springs when the car is full or partially loaded, as will be explained.

The fourth part of my invention relates to a roller-bearing or antifriction device between the truck-frame and the car-body. I am aware that various kinds of flat friction devices, as well as rollers, have been employed in trucks for the purpose of facilitating the circular movement of the truck relatively to the car-body and enabling the truck to move easily upon and around curves upon the road. I have differentiated my contrivance from these forms or devices in several important particulars. In carrying this part of my invention into effect I use a flanged roller having in it a loose shaft with a ferrule to keep the rollers from skidding. The roller is suspended in any suitable manner from the body-bolsters of the car-body and travels on tracks on the upper surface of the truck-bolster. In all the forms shown in the drawings the upper member of the bolster is made of channel-iron or of angle-iron, and my invention is limited specifically to such a structure, in combination with a suitable lower member or brace, which lower member may take any of the forms which I have shown and described, the two members being locked together by means of the straps. The special arrangement which I have provided for the loose motion of the shaft in its bearings prevents the binding of these parts and eliminates the possibility of the skidding of the roller upon the track.

The fifth part of my invention relates to a novel construction of axle-box. I provide in connection with said axle-box a spring which provides for a certain degree of movement, so as to relieve the parts within the axle-box, and more especially the axle, from strain and shock during excessive or unusual movements and to remove to a far greater degree than heretofore the possibility of jar on the journals by reason of bad joints on the track-rails.

The sixth part of my invention relates to a new mode of suspending brake-beams independent of the car-body, so that the braking apparatus will not partake of and, in fact, will be wholly independent from car-body movements when the train is in motion. I have provided two methods of suspending the brake-beam in my present invention. One form is intended for the trucks of freight-cars, the other to the long wheel-base or passenger truck.

The seventh part of my invention relates to an improved form of brake-shoe head. Brake-shoe heads as now employed are made solid and heavy. I have devised a lighter construction and have made a hollow and perforated brake-shoe head, as will be described.

The eighth part of my invention relates to the construction and arrangement of the brake-shoes themselves. Brake-shoes as at present made have no guide to keep them in position, so that when the bearings of the brake-shoe hangers become worn the lateral movement of the brake-rigging occasioned thereby will permit the shoes as now employed to slip from the wheels. To prevent this, I cast or in any convenient way secure on the outer edge of the shoe a flange or finger, which will bear against the outer edge of the wheel, and the two opposed shoes, one upon each end of the brake-beam, being balanced against each other, will be maintained in the right and proper position. I also construct the shoe of such a shape that the bearing surface or surfaces which come in contact with the wheel-tread will only wear those parts of the said wheel-tread which are not much worn by the rail. The shoe also is arranged to press upon the point of the flange where it is not at all worn by the rails.

I have devised and will explain other novel devices incorporated in my improved car-truck, and I will now proceed to describe my invention in connection with the accompanying drawings, and which form a part of the specification, and in which—

Figure I represents an end view of a portion of a car-truck embodying my improvements. Fig. II represents a cross-section of the same on the line X X, Fig. I. Fig. III is a central longitudinal sectional view, to a larger scale, of the upper portion of one end of the truck. Fig. IV is a top view of one end of the truck. Figs. V, VI, and VII are detail views hereinafter particularly referred to. Fig. VIII is a detail view of the form of truck employed by me for freight-cars, showing the special method of suspending the brake-beam in such cases. Fig. IX is a longitudinal section of the same part. Figs. X, XI, XII, and XIII are detail views showing the construction of the brake-shoe and brake-shoe head. Figs. XIV, XV, and XVI are respectively a plan view, longitudinal section, and cross-section of one form of lattice truck-bolster. Figs. XVII, XVIII, and XIX are respectively a plan view, longitudinal section, and cross-section of a modified form of my improved lattice truck-bolster. Figs. XX, XXI, and XXII are respectively a plan view, longitudinal section, and cross-section of another form of my improved lattice truck-bolster. Figs. XXIII, XXIV, and XXV are similar views of an analogous construction.

Referring to the drawings, 1 represents the upper member of the bolster of my improved truck, which member is formed of channel-iron, as shown. Immediately beneath and rigidly secured to the member 1 is a supplementary or auxiliary channel-iron 2, which extends inwardly from the ends of the truck, as shown in Figs. II and III, to a point just within the line of travel of the car-body-supporting bearings hereinafter referred to. At this point the auxiliary or supplementary channel-iron 2 is bent downwardly until it approaches the center of the car. Before, however, it reaches this point it again assumes a horizontal position. (See Fig. II.) The channel-irons 1 and 2 therefore constitute the bolster in my improved truck, and besides being bolted to each other at their respective ends they are secured and braced at intermediate points as follows:

At 3 I employ one or more flat straps or bars arranged in a vertical position and secure the said straps or bars rigidly to the two members of the truck-bolster, as shown in Fig. II. There may be a number of these bars or straps, if desired; but in any case there is at least one upon each side of the center of the bolster, and preferably two or more, although but two are shown. These straps extend between the upper member of the bolster and the diagonal or slanting portions of the lower members, so as to brace the weakest portions of the truss-shaped structure.

At 4 I employ two chairs or braces which fit beneath and within the channel of the upper member of the bolster and rest upon the upper surface of the lower member. These two chairs are arranged one on each side of the center of the truck and are locked in position by means of bolts 5, extending between and through both members 1 and 2. The same bolts serve to lock the center bearing 6 of the king-pin (not shown) in position.

In Figs. XIV, XV, and XVI, I show approximately the same form of bolster, which

I call a "lattice" truck-bolster. It has but slight variations from the form shown in Figs. II and III, the supporting-chair 4 being omitted from the drawings and the straps or bars 3 being moved nearer the center.

In Figs. XVII, XVIII, and XIX the top channel-iron 1 is modified to the extent that the main or central portion is omitted and in lieu thereof the cross-straps 1$^a$ are substituted. The vertical bars 3 may in this case be increased in number from two to four, and in lieu of the lower channel-iron of the bolster I employ round rods 7.

In Figs. XX, XXI, and XXII, I show another form of lattice-bolster, and in place of the cross-bars 1$^a$ I employ cylindrically-shaped attaching-bars 1$^b$ and provide upwardly-extending flanges 1$^c$, to which said cross-rods 1$^b$ are attached.

In Figs. XXIII, XXIV, and XXV, I show another form of my lattice truck-bolster, the cross-bars 1$^d$ in this case being provided with downwardly-extending flanges 1$^e$ and the lower member of the bolster being formed of a single piece of flat iron 1$^f$, which is secured to the upper members 1 by means of the bars 3.

In all of these forms the chair 4, though eliminated from the drawings, is retained in actual practice in combination with the upper and lower members of the bolster and the bracing-straps. It will be noticed in all cases that the straps connect with the lower member of the bolster only at its slanting portions, while the chair 4 rests entirely upon the flat or central portion of the lower member. I do not wish to be understood as representing that the employment of the chair 4 is a novel feature in railway-truck bolsters, as it is not, and I consider that the essential elements which go to make up what I term my "lattice" truck-bolster are the upper and lower members thereof, constructed substantially as shown and described and provided with the bracing-straps extending between the upper member and the slanting portions of the lower member. I have termed this structure a bolster, but I intend it to cover and include any truss or structure employed in a truck and which operates to receive the weight of and support the car-body.

Referring now to Figs. I, II, and III, the lower transom is shown at 8. This lower transom is formed of a channel-iron (shown in end view, Fig. I) and is secured by bolts 9 to ears 10 of the pillars or pedestals 11. This pedestal rests upon the lower or inverted arch-bar 12, and is securely locked thereto and to the upper arch-bar 13 by means of bolts 14, said bolts passing centrally through said pedestals or pillars and through the arch-bars, both upper and lower, and also through the pedestal tie bar or strap 15, all of which parts the bolts, in connection with the nut 16, lock securely together.

It will be seen from what I have just described that I reject the ordinary and common form of flat arch-bar and introduce a channel-iron which will, weight for weight, be of far greater strength than the flat arch-bars ordinarily employed.

The pedestals or pillars are connected to each other at their upper ends by a strap 17, which surrounds the main portion of the truck, as shown in Fig. IV, and which is secured to the lower transom 8 by means of bars 18.

I will now proceed to describe my special arrangement and distribution of springs. At 19 I show graduated elliptic springs, and in constructing I employ elliptic springs of sufficient strength to carry the car when not loaded. These elliptic springs are shown at the extreme outside ends of the truck, so as to obtain the advantage of receiving the thrust of the bolster in the most economical manner, as it is enabled to resist the stress at this point with more efficiency than at any intermediate point. These elliptic springs are arranged parallel with the ends of the truck, and immediately inside of the elliptic springs I place the coil-springs, which operate as reserves and are adapted to assist the elliptic springs when the car is fully or partially loaded. These coil-springs 20 are arranged inside of the elliptic springs, as stated, but outside of the outer edge of the wheel-tread and preferably at about the point shown, that is to say, the center of the coil-springs falls outside of a line drawn centrally through the arch-bars. By arranging the springs in these positions I have found by experiment that they are adapted to produce the most economical and satisfactory results in many ways.

Referring to Fig. III, I show at 21 a plate or cap which corresponds with the intermediate transom shown, described, and claimed in my former patent hereinbefore referred to. This cap or plate rests upon the top of the elliptic springs and is provided with a centrally-located head 22, which forms a seating for a roller or rocker 23. This rocker corresponds with the roller in my former patent and is provided on its upper surface with teeth, as shown, which mesh with corresponding teeth in the plate 24, secured to the under surface of the truck-bolster 1 2. By this means the slight lateral play required by the truck-bolster is secured.

I will now proceed to describe the antifriction device employed by me between the car-body bolster 25 and the truck-bolster. Upon the upper surface of the bolster 1 1 arrange a semicircular track 26, and upon the car-body bolster 25 provide hangers 27, in which is suspended a roller 28. This roller is provided with flanges on both sides and is arranged to travel on the track 26 of the truck-bolster. The body-bolster rests upon the upper surface of the roller through the medium of the bearing-plate 29. (See Figs. III and VI.) This bearing-plate 29 takes the form of a track. To retain the roller in position, I provide a loose shaft 30. This shaft is not intended to support any weight. It is surrounded with a ferrule or thimble 31. As the body-bolster rests through the medium of the track 29 upon the upper surface of the roller 28, and as the roller bears upon the track 26 of the truck-bolster, there would be a tendency upon the part of the roller to bind or skid unless the loose connection just described is provided.

In Fig. I, I show an improved axle-box. The axle 32 of the wheel 33 supports the truck-frame through the medium of brass or journal 34, cup 35, and spring 36. This spring is an exceedingly stiff one and is not intended to operate under ordinary conditions, but where sudden and excessive strains are imposed upon the wheels, such as result from inequalities of rails or at rail-joints, the resulting jar or shock will cause the spring to be compressed, thus cushioning the axle against the truck-frame. The cup 35 is provided with shoulders 37, which are adapted to seat upon corresponding brackets 38 of the axle-box 39. When the cup is in position, I insert the spring 36, and then press the spring down, as shown in the drawings, by means of the cap 40. When the parts are in this position, the arch-bars are placed over the top of the axle-box and securely locked in place by means of the bolts 14.

To relieve the truck of strains during the braking operation and prevent the tendency of brakes to lift wheels from the track, I suspend the brake-rigging in my improved truck from the fixed portions of the truck-frame.

In Figs. I and II, I have shown the brake-hangers 41 dependent from a carrier 42. This carrier is attached to and extends between both of the inverted arch-bars. It thus serves as a carrier for the brake-rigging and also constitutes at the same time a brace or truss between the two ends of the truck-frame and prevents any tendency of the truck to twist at the axle-boxes. I may also extend the brace 42 downwardly, as shown at 43 in Fig. I, and securely attach it to the tie-bar. By this means I secure additional strength. This method of suspending the brake-rigging is employed in long brace or passenger trucks, but in freight-trucks I prefer to hang it, as shown in Figs. VIII and IX, from the binding-strap 17 or the pedestal or pillar of the truck-frame. In Figs. VIII and IX aforesaid I show a bracket 44 extending upwardly and inwardly from the pedestal or pillar, and secure it by means of a bolt 45 to the strap 17. The hanger 41 is suspended from this bracket, but in either case the result is the same. In both cases I have suspended the brake-rigging from the immovable parts of the truck, so that the brake-rigging will not partake of the car-body movement.

In Figs. XII and XIII, I show an improved brake-shoe head 46. This brake-shoe head is made hollow to secure lightness as well as strength.

The U-shaped brake-beam 47 is secured to the receiving-plate 48 of the brake-shoe in the manner shown in Figs. I and VIII.

In Fig. V, I show the brake-beam 47 having a link 49 for attaching the brake-chain.

To prevent the brake-shoe from slipping sidewise from the wheels, I provide a finger 50, which laps over the outside edge of the wheel, as shown in Figs. X and XI. I have constructed the brake-shoe so that it will bear only against those parts of the wheel-tread which do not ordinarily come in contact with the rail.

I claim as new and of my invention—

1. The combination in a car-truck of elliptic springs and coil-springs, the elliptic springs being arranged parallel with the length of the car and at the end of the bolster and outside of the frame, and so arranged as to take the entire weight of the car when the latter is empty, and the coil-springs being located inside of, and adapted to operate as supplementary springs to, the elliptics, and to come into play only when the car is loaded, with the bolster and the bottom transom, as set forth.

2. In a car-truck the combination of an axle-box rigidly secured in the truck-frame and springs located within the axle-box and between the journal of the axle and the top of the axle-box, and a containing-cup in which the said spring is located, all adapted to operate substantially as and for the purposes set forth.

3. In a car-truck the combination of the upper arch-bar, the inverted arch-bar and the cross-brace 42 adapted to operate as a carrier for the brake-hanger and as a truss for the truck-frame, the said cross-brace being connected to the inverted arch-bar, substantially as and for the purposes set forth.

HUGH BAINES.

Witnesses:
 HERBERT KNIGHT,
 S. E. MARTIN.